United States Patent
Jokela et al.

(10) Patent No.: US 8,345,647 B2
(45) Date of Patent: Jan. 1, 2013

(54) FLEXIBLE MULTICAST AND/OR BROADCAST LISTENING INTERVALS

(75) Inventors: Jari Jokela, Ylöjärvi (FI); Jarkko Kneckt, Espoo (FI)

(73) Assignee: Nokia Corporation, Espoo (FI)

( * ) Notice: Subject to any disclaimer, the term of this patent is extended or adjusted under 35 U.S.C. 154(b) by 447 days.

(21) Appl. No.: 11/592,746

(22) Filed: Nov. 3, 2006

(65) Prior Publication Data
US 2007/0127478 A1 Jun. 7, 2007

Related U.S. Application Data

(60) Provisional application No. 60/733,739, filed on Nov. 4, 2005.

(51) Int. Cl.
*H04Q 7/24* (2006.01)
(52) U.S. Cl. ........ 370/338; 455/411; 455/422; 455/502; 455/518; 455/574; 370/341; 370/346; 370/360; 370/348; 370/401; 370/329; 370/389; 370/252; 370/312; 370/432; 370/390; 370/217; 370/331
(58) Field of Classification Search .................. 709/226, 709/238, 233, 245; 370/338, 331, 329, 395.3, 370/389, 401, 310, 474, 254, 252, 462, 332, 370/348, 341, 346, 360, 311, 312, 432; 455/411, 455/552.1, 422.1, 41.2, 432.1, 569.2, 502, 455/518, 574, 127.5, 420
See application file for complete search history.

(56) References Cited

U.S. PATENT DOCUMENTS

| | | | |
|---|---|---|---|
| 6,269,404 B1 * | 7/2001 | Hart et al. | 709/238 |
| 6,674,738 B1 * | 1/2004 | Yildiz et al. | 370/338 |
| 7,269,152 B2 * | 9/2007 | Vukovic et al. | 370/332 |
| 7,274,929 B1 | 9/2007 | Banginwar | 455/418 |
| 7,313,111 B2 * | 12/2007 | Hietalahti et al. | 370/329 |
| 7,382,757 B2 * | 6/2008 | LoGalbo et al. | 370/338 |
| 7,522,540 B1 * | 4/2009 | Maufer | 370/254 |
| 7,916,687 B2 | 3/2011 | Deshpande et al. | 370/328 |
| 2002/0159407 A1 * | 10/2002 | Carrafiello et al. | 370/328 |
| 2003/0037160 A1 * | 2/2003 | Wall et al. | 709/233 |

(Continued)

FOREIGN PATENT DOCUMENTS

EP 1463242 A2 9/2004
(Continued)

OTHER PUBLICATIONS

"Enhanced Power-Saving Mechanism for Broadcast and Multicast Service in WLAN" Hyu-Dae Kim and Dong-Ho Cho, IEEE Communications Letters. vol. 9, No. 6 Jun. 2005.

(Continued)

*Primary Examiner* — Joseph Arevalo
(74) *Attorney, Agent, or Firm* — Harrington & Smith

(57) ABSTRACT

The present invention provides a new and unique method and apparatus for communicating information between two nodes, points or terminals in a wireless local area network (WLAN), where a variable multicast and/or broadcast listening interval and associated signalling is allowed between the two nodes, points or terminals in the wireless LAN network. The two nodes, points or terminals include an access point (AP) or other suitable network node or terminal and a station (STA) or other suitable network node or terminal in the WLAN. The AP and the STA can indicate its capability to support a flexible multicast and broadcast listening interval by using new fields in Beacon and Probe Response frames and in (Re)Association Request Frames. The multicast and broadcast service is setup by using Multicast and Broadcast Service Setup signalling.

35 Claims, 3 Drawing Sheets

The 3GPP Network in More Detail

U.S. PATENT DOCUMENTS

| | | | |
|---|---|---|---|
| 2004/0037308 A1* | 2/2004 | Chen et al. | 370/462 |
| 2004/0160916 A1* | 8/2004 | Vukovic et al. | 370/332 |
| 2004/0192284 A1 | 9/2004 | Vaisanen et al. | |
| 2004/0253948 A1* | 12/2004 | Laberteaux | 455/422.1 |
| 2004/0264422 A1* | 12/2004 | Calcev et al. | 370/338 |
| 2005/0009512 A1* | 1/2005 | Rue | 455/420 |
| 2005/0080901 A1* | 4/2005 | Reader | 709/226 |
| 2005/0141442 A1* | 6/2005 | Morris et al. | 370/310 |
| 2005/0174953 A1* | 8/2005 | Ho | 370/310 |
| 2005/0245215 A1 | 11/2005 | Abhishek et al. | |
| 2005/0288069 A1* | 12/2005 | Arunan et al. | 455/574 |
| 2006/0083200 A1* | 4/2006 | Emeott et al. | 370/331 |
| 2006/0098613 A1* | 5/2006 | Kish et al. | 370/338 |
| 2006/0126533 A1* | 6/2006 | Wang | 370/254 |
| 2006/0165031 A1* | 7/2006 | Wang et al. | 370/328 |
| 2006/0166699 A1* | 7/2006 | Aghvami et al. | 455/552.1 |
| 2006/0187864 A1 | 8/2006 | Wang et al. | 370/311 |
| 2006/0229061 A1* | 10/2006 | Chaplin | 455/411 |
| 2007/0087767 A1* | 4/2007 | Pareek et al. | 455/502 |
| 2007/0104199 A1* | 5/2007 | Taha | 370/392 |
| 2007/0291681 A1 | 12/2007 | Jokela | 370/328 |
| 2007/0291725 A1* | 12/2007 | Kowalski | 370/338 |
| 2007/0297438 A1 | 12/2007 | Meylan et al. | 370/445 |
| 2008/0062948 A1 | 3/2008 | Ponnuswamy | 370/342 |
| 2008/0194201 A1* | 8/2008 | Sinivaara et al. | 455/41.2 |

FOREIGN PATENT DOCUMENTS

| | | |
|---|---|---|
| EP | 1 684 465 A1 | 7/2006 |
| EP | 1 684 466 A1 | 7/2006 |
| EP | 1684467 A1 | 7/2006 |
| KR | 20050065123 | 6/2005 |
| WO | 2004029770 | 4/2004 |
| WO | 2005076544 | 8/2005 |
| WO | 2007052137 | 5/2007 |
| WO | WO 2008/081277 A2 | 7/2008 |

OTHER PUBLICATIONS

"An Energy Efficient MAC Protocol for Wireless LAN's" Eun-Sun Jung and Nitin H. Vaidya, Twenty-First Annual Joint Conference of the IEEE Computer and Communications Societies Proceedings. IEEE Vo. 3 2002 se p. 1756-1759; abstract.

"Broadcast and Multicast Enhancements" Jari Jokela, Doc: IEEE 802.11-05/1075r0, 5/11/205—http://www.ieee802.org/11/DocFiles/05/—see slides 15-16.

"Power Management Modeling and Optimal Policy for IEEE 802.11 WLAN Systems" Huan Chen amd Cheng-Wei Huang, Vehicular Technology Conference, 2004 vol. 6; Sep. 26-29, 2004 see pp. 4416-4418; p. 4420; abstract.

4 Pages English Language Translation of Korean Office Action dated Dec. 16, 2009.

20050065123 English Language Translation, Jun. 29, 2005.

Jokela, J., CID 186 and 211 Normative Text, Wireless LANs, IEEE 802.11-07/0066r1 (Jan. 15, 2007), pp. 1-7.

Meylan, A. et al., Normative Text Proposal for TGv, Wireless LANs IEEE 802.11-06/0489R01 (May 16, 2006, pp. 1-12.

Meylan, A. et al., Standby Time Improvements:, IEEE 802.11-06/0636r1, (May 16, 2006).

Jokela, J. et al., "Broadcast and Multicast Enhancements", IEEE 802.11-06/0947r0, pp. 1-18, (Jul. 18, 2006).

Jokela, J. et al., "Broadcast and Multicast Enhancements", IEEE 802.11-06/1030r1, (Jul. 18, 2006).

IEEE P802.11v/D0.05, Draft to Standard for Information Technology—Telecommunications and Information Exchange Between Systems—LAN/MAN Specific Requirements—Part 11: Wireless Medium Access Control (MAC) and Physical Layer (PHY) Specifications, pp. 1-158, (Sep. 2006).

Acquavavia, A. et al., "A Methodology Basedon Formal Methods for Predicting the Impact of Dynamic Power Management", http://www.sti.uniurb.it/bonta/book—chapters/sfm05moby—01.pdf, Formal Methods for Mobile Computing, M. Bernardo & A. Bogliolo editors, Lecture Notes in Computer Science 3465, pp. 155-189 (Apr. 2005).

Bonta, E. et al., "Synthesizing Concurrency Control Components from Process Algebraic Specifications", http://www.sti.uniurb.it/bonta/conference—papers/coordination2006.pdf, roc. Of the 8$^{th}$ Int. Conf. On Coordination Models and Languages (Coordination 2006), P. Ciancarini and H Wiklicky editors, Lecture Notes in Computer Science 4038, pp. 28-43, (Jun. 2006).

Bernardo, M. et al.; "Predicting the Functional/Performance Impact of Dynamic Power Management", http://www.sti.uniurb.it/bonta/conference—papers/pmccs2005.pdf, Proc. Of the 7$^{th}$ Int. Workshop on Performability Modeling of Computer and Communication Systems (PMCCS 7), pp. 10-13, (Sep. 2005).

Bernardo, M. et al., Preserving Architectural Properties in Multithreaded Code Generation, http://www.sti.uniurb.it/bonta/conference—papers/coordination2005.pdf, Proc of the 7$^{th}$ Int. Conf. On Coordination Models and Languages (Coordination 2005), J.M. Jacquet and G.P. Picco editors, Lecture Notes in Computer Science 3454, pp. 188-203, (Apr. 2005).

Acquaviva, A. et al., "Assessing the Impact of Dynamic Power Management on the Functionality and the Performance of Battery-Powered Appliances", http://www.sti.uniurb.it/bonta/conference—papers/dsn2004.pdf, Proc. Of the 4$^{th}$ Working IEEE/IFIP Conf. On Dependable Systems and Networks (DSN 2004), IEEE-CS Press pp. 731-740, (Jun. 2004).

Bernardo, M. et al., "Generating Well-Synchronized Multithreaded Programs from Software Architecture Descriptions", http://www.sti.uniurb.it/bonta/conference—papers/wicsa2004—new.pdf, Proc. Of the 4$^{th}$ Working IEEE/IFIP Conf. On Software Architecture (WICSA 2004), J. Magee, C. Szyperski and J. Bosch editors, IEEE-CS Press, pp. 167-176, (Jun. 2004).

Acquaviva, A. et al., "Dynamic Power Management Strategies Within the IEEE 802.11 Standard" http://www.sti.uniurb.it/bonta/book—chapters/sfm05moby—02.pdf, in Formal Methods for Mobile Computing, M Pernardo and A Bogliolo editors, Lecture Notes in Computer Science 3465:19-214, (Apr. i2005).

IEEE P802.1 lv/D003 "Draft Amendment to Standard for Information Technology—Telecommunications and Information Exchange Between Systems—LAN/MAN Specific Requirements—Part 11: Wireless Medium Access Control (MAC) and Physical Layer (PHY) Specifications Amendment v: Wireless Network Management" Prepared by the IEEE 802.11 Working Group of The IEEE 802 Committee, pp. 10250, copyright 2006 by the Institute of Electrical and Electronic Engineers, inc.

* cited by examiner

FIG. 1a: 802.11 Wireless Local Area Network (WLAN)

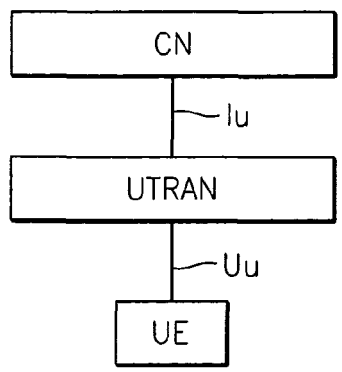
FIG. 4a: The Basic 3GPP Network
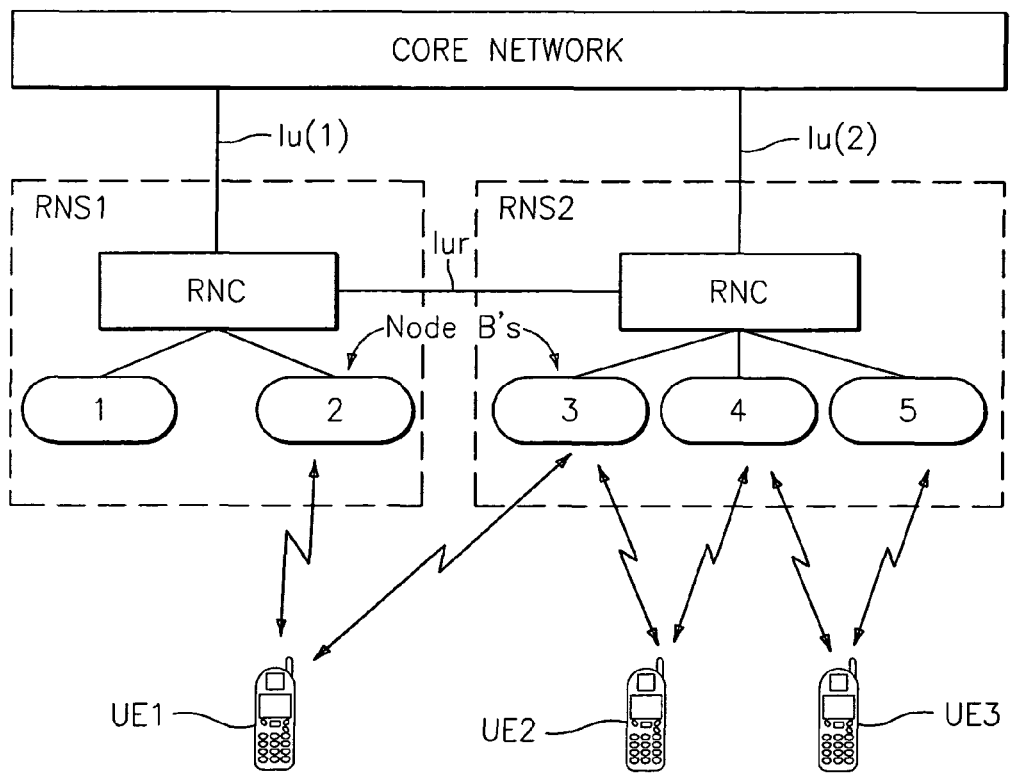
FIG. 4b: The 3GPP Network in More Detail

FLEXIBLE MULTICAST AND/OR BROADCAST LISTENING INTERVALS

CROSS-REFERENCE TO RELATED APPLICATIONS

This application claims benefit to provisional patent application Ser. No. 60/733,739, filed 4 Nov. 2005, which is hereby incorporated by reference in its entirety.

BACKGROUND OF THE INVENTION

1. Field of Invention

The present invention related to a method and apparatus for providing multicast and/or broadcast service optimisations in wireless LAN networks, including that set forth in IEEE 802.11.

2. Description of Related Art

The problem with the current multicast service scheme in IEEE 802.11 networks is related to power save functionality. The base standard defines fixed power save scheme to be used by broadcast and different multicast services. The scheme basically defines a fixed listen interval for the non-AP STAs. The AP will buffer all the broadcast and multicast traffic and after specific DTIM Beacon frame (DTIM is every nth Beacon frame) it will deliver automatically all the buffered broadcast and multicast traffic. The problem here is that different broadcast and multicast services may have very different service characteristic and having only one static scheme in WLAN level is not flexible enough. The services may vary from very basic IP level broadcast services like Address Resolution Protocol (ARP) or Dynamic Host Configuration Protocol (DHCP), which typically have low bit rates with relaxed delay requirements, to different multicast streaming services (audio, video, . . . ) having high bit rate requirements and more strict real time requirements.

In effect, with WLAN multicast service enhancement, there can be different services: others like ARP are creating IP connectivity for the terminal. These protocols are running in the background all the time. When the terminal is inactive, in stand by state, the power consumption to receive data from these protocols defines the stand by power consumption. These protocols require long multicast/broadcast listen intervals, in order to reduce activity periods and power consumption. Some applications, like audio and video services, need short multicast listening intervals in order to meet QoS and delay requirements.

Currently, the AP can indicate that there is buffered broadcast or multicast data with the same single bit. This causes the terminals to listen to the multicast data even though they would not be receiving any themselves.

SUMMARY OF THE INVENTION

In its broadest sense, the present invention provides a new and unique method and apparatus for communicating information between two nodes, points or terminals in a wireless local area network (WLAN), wherein a variable multicast and/or broadcast listen interval and associated signalling is allowed between the two nodes, points or terminals in the wireless LAN network.

The two nodes, points or terminals include an access point (AP) or other suitable network node or terminal and a station (STA) or other suitable network node or terminal in the WLAN.

In operation, the AP and the STA can indicate its capability to support flexible multicast and broadcast listening intervals by using the fields specified in this invention in Beacon and Probe Response frames and in (Re)Association Request and Response Frames. The multicast and broadcast service is setup by using Multicast and Broadcast Service Setup signalling.

In effect, the present invention allows flexible multicast and broadcast listening interval usage in the MAC level. One part of the present invention is a signalling scheme that can be used to setup the listen interval per multicast group. According to some embodiments of the present invention, broadcast traffic shall be transmitted using a legacy DTIM interval, but the DTIM interval can be set to be rather long as there is no need to support different multicast services, which typically have tighter requirements, anymore.

The present invention also includes a mechanism that allows the AP to advertise active multicast and broadcast services within the BSS.

The present invention also includes a mechanism to indicate separately whether there are buffered broadcast traffic or buffered multicast traffic (per each multicast group (address)) in the AP.

Overall, the present invention provides means to achieve better performance for broadcast and multicast services in IEEE 802.11 networks by enabling:
  setting DTIM interval rather long,
  advertisement of multicast services by the AP, and
  indication per multicast group whether there are buffered broadcast/multicast traffic in the AP.

Moreover, beacons and probe responses can be used to advertise active listen intervals using a Multicast service information element therein, as described by way of example in the aforementioned related provisional patent application 60/733,999, related to sections of IEEE P802.11, which provides an indication about buffered broadcast/multicast data in the AP (Buffered Traffic Indication).

BRIEF DESCRIPTION OF THE DRAWING

The drawing includes the following Figures, which are not necessarily drawn to scale:

FIG. 1a shows an IEEE 802.11 WLAN system according to some embodiments of the present invention.

FIGS. 4a and 4b show diagrams of the Universal Mobile Telecommunications System (UMTS) packet network architecture according to some embodiments of the present invention.

BEST MODE OF THE INVENTION

FIG. 1a shows, by way of example, an IEEE 802.11 WLAN system generally indicated as 2, which provides for communications between communications equipment such as mobile and secondary devices including personal digital assistants (PDAs) 3, laptops 4 and printers 5, etc. The WLAN system may be connected to a wired LAN system that allows wireless devices to access information and files on a file server or other suitable device or connecting to the Internet. The devices can communicate directly with each other in the absence of a base station in a so-called "ad-hoc" network, or they can communicate through a base station, called an access point (AP) in IEEE 802.11 terminology, labeled 6 with distributed services through the AP using local distributed services (DS) or wide area extended services, as shown. In a WLAN system, end user access devices are known as stations (STAs), which are transceivers (transmitters/receivers) that convert radio signals into digital signals that can be routed to and from communications device and connect the communications equipment to access points (APs) that receive and distribute data packets to other devices and/or networks. The STAS may take various forms ranging from wireless network interface card (NIC) adapters coupled to devices to integrated radio modules that are part of the devices, as well as an external adapter (USB), a PCMCIA card or a USB Dongle (self contained), which are all known in the art.

Figure 1B:
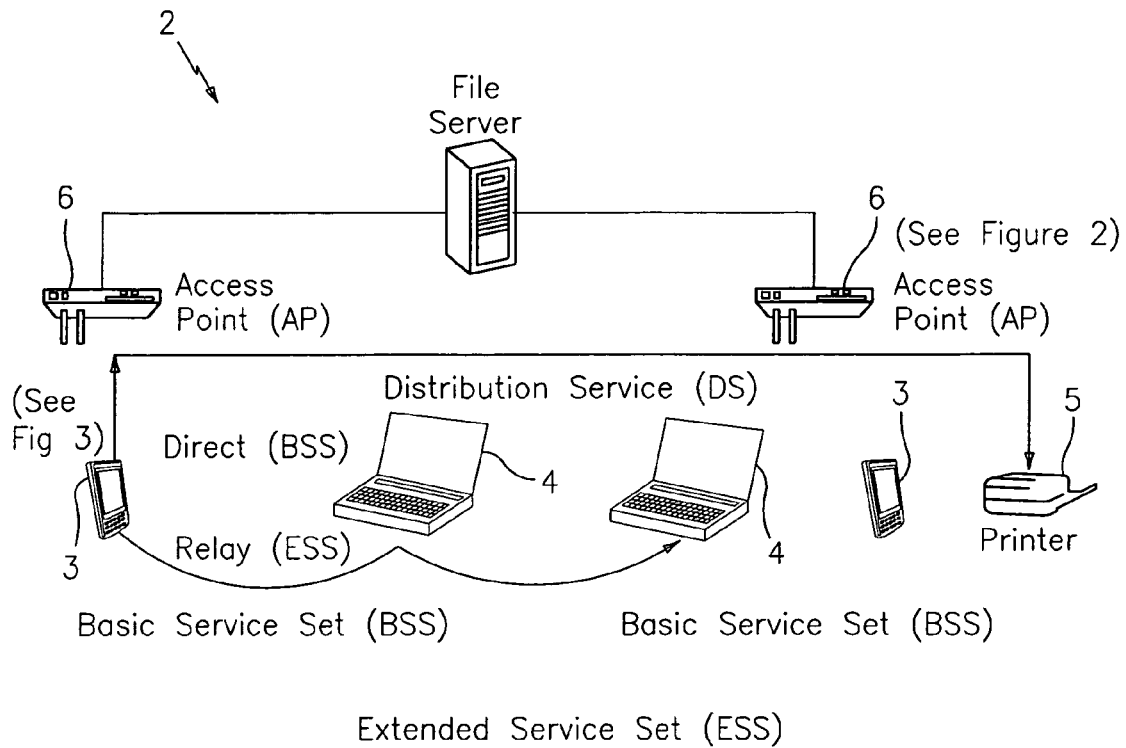
FIG. 1b shows the basic steps of the method according to some embodiments of the present invention.
Figure 1B:
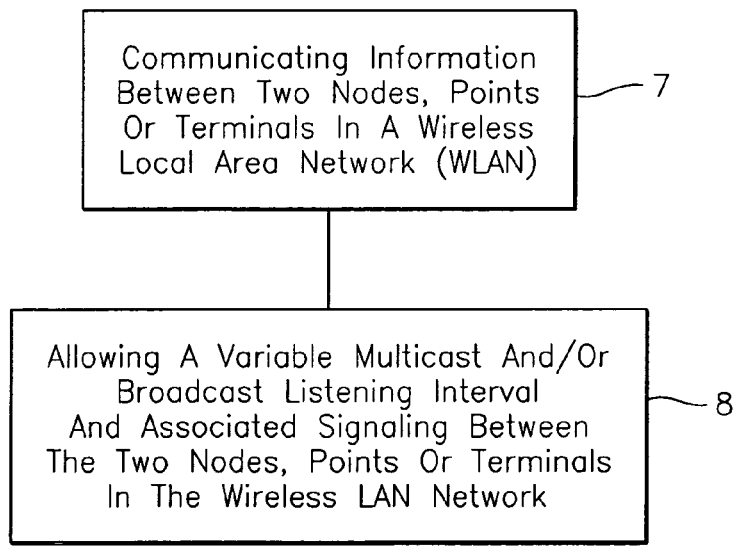

The present invention provides a new and unique method and apparatus for communicating information between two such nodes, STAs, points or terminals in such a wireless local area network (WLAN) shown in FIG. 1a, wherein a variable multicast and/or broadcast listening interval and associated signalling is allowed between the two nodes, STAs, points or terminals in the wireless LAN network. FIG. 1b shows the basic steps 7 and 8 of the method according to some embodiments of the present invention.

Figure 2:
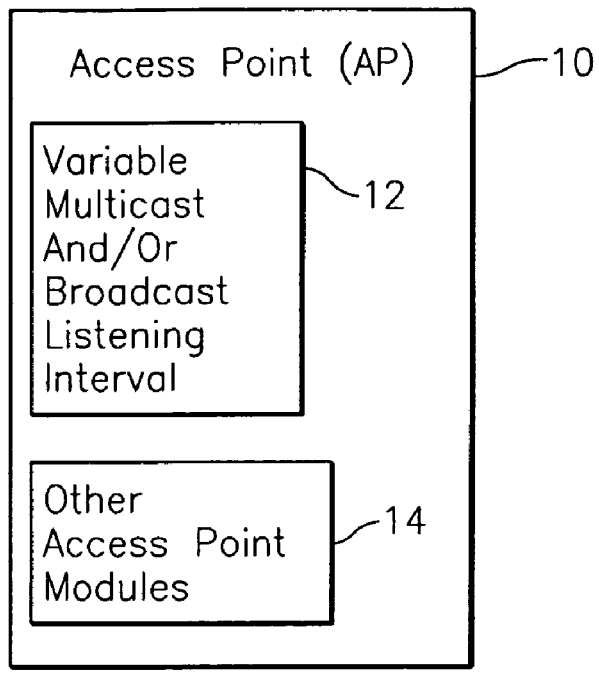
FIG. 2 shows an access point (AP) according to some embodiments of the present invention.
Figure 3:
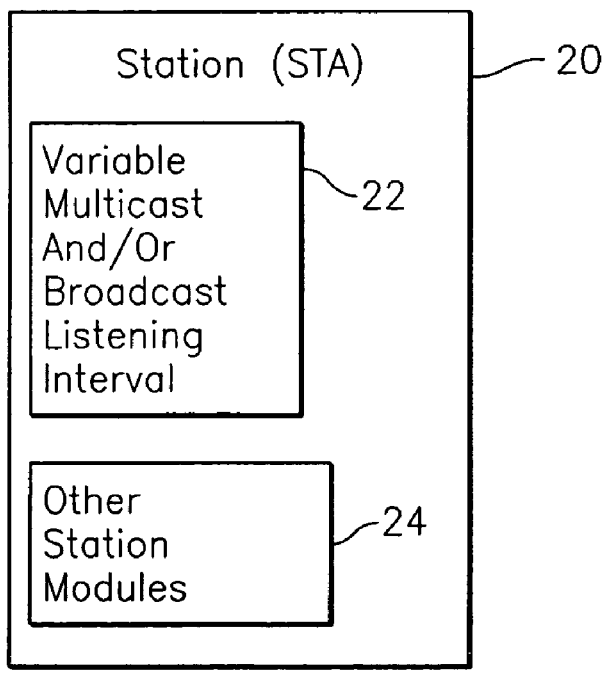
FIG. 3 shows a station (STA) according to some embodiments of the present invention.

The two nodes, STAs, points or terminals in the WLAN may include an access point (AP) or other suitable network node or terminal 10 shown in FIG. 2 and a station (STA) or other suitable network node or terminal 20 shown in FIG. 3, for operating in a wireless LAN network consistent with that shown in FIG. 1a. The AP 10 and the STA 20 have corresponding modules 12 and 22 configured for allowing the variable multicast listening interval and associated signalling between the two nodes, points or terminals in the wireless LAN network. In effect, the scheme allows negotiation for both multicast and broadcast type data.

The Basic Implementation

The basic implementation and cooperation of the AP 10 and STA 20 according to some embodiments of the present invention may include the following:

The AP and the STA have possibilities to indicate its capability to support a flexible multicast and broadcast listening interval by using new fields in Beacon and Probe Response frames and in (re)Association request frames. By way of example, these new fields are described in the aforementioned related provisional patent application Ser. No. 60/733,999, filed on 4 Nov. 2005, which is hereby incorporated by reference in its entirety, which corresponds to sections of IEEE 802.11 related to Radio Resource Management Capabilities. The scope of the invention is not intended to be limited to using the new fields in Beacon and Probe Response frames and in (re)Association request frames described in the aforementioned application. For example, embodiments are envisioned and the scope of the invention is intended to include using other types of fields in Beacon and Probe Response frames and in (re)Association request frames either now known or later developed in the future.

The multicast and broadcast service can be setup by using Multicast and Broadcast Service Setup signalling. During this signalling phase the listening interval for the multicast and broadcast service can be agreed upon. The STA can propose a listening interval based on the multicast and broadcast service characteristic and the AP can either accept the proposal or define a new listen interval. The same listening interval should be used for all terminals that receive the same multicast and broadcast transmission. By way of example, multicast Service Setup is described in the aforementioned related provisional patent application Ser. No. 60/733,999, which corresponds to sections of IEEE 802.11 related to frame formats. However, the scope of the invention is not intended to be limited to using the multicast Service Setup described therein. For example, embodiments are envisioned and the scope of the invention is intended to include using other types of multicast Service Setups either now known or later developed in the future.

The AP can also advertise the active listen intervals by sending Multicast Service Info information element is each Beacon and Probe Response frame. By way of example, this information element is described in provisional patent application Ser. No. 60/733,999, which corresponds to sections of IEEE 802.11, although embodiments are envisioned and the scope of the invention is intended to include using other types of information elements either now known or later developed in the future. By using this element the AP can also indicate whether there are buffered broadcast data (Buffered Broadcast Data) and/or buffered multicast traffic belonging to certain multicast group (Buffered Traffic Indication). Generally having Multicast Service Info field in the Beacon and Probe Response may be valuable information for the roaming STAs as they will immediately know what are the active multicast services within the BSS.

The new features of operation during power save modes are consistent with and forms part of sections of IEEE P802.11, and are described as follows:

Enhanced Multicast and Broadcast Power Management

With enhanced multicast and broadcast service according to some embodiments of the present invention, it is possible to create flexible service intervals for multicast and broadcast services.

A service interval for the multicast and broadcast service is created by using the multicast and broadcast service setup signaling. A non-AP STA wishing to join the multicast group can propose multicast listen interval to the AP. The Multicast and Broadcast listening interval can be either multiple of Beacon periods or it can be specified in number of Time Units (TUs). Duration of TU is 1024 micro seconds. The AP will make the selection of the multicast and broadcast listening interval and will indicate it in Multicast and Broadcast Service Setup Response frame, in Multicast Service Mode Change frame and in Beacon and Probe Response frames.

AP Operation

If enhanced multicast service is used according to some embodiments of the present invention, the AP shall send a beacon with a complete Multicast Service Info field at every beacon.

Another embodiment of the invention would be to send a complete Multicast Service Info field at every DTIM beacon. At a TIM beacon, the AP shall transmit a Multicast Service Info element that contains information of Multicast services that transmit data after this TBTT. If the multicast data transmission is scheduled after the TBTT and the multicast address is not listed in Mulitcast Service Info, no data from the multicast address is transmitted after the TBTT. The Multicast Service Info element that is transmitted after TIM beacon TBTT shall not contain information of the multicast services that transmit data between TUs. A Buffered Traffic Indication bit shall be set if there are buffered frames belonging to particular multicast group.

If enhanced multicast and broadcast service is used according to some embodiments of the present invention, the AP will send all multicast frames belonging to a particular multicast group after the service interval which is specified for the multicast and broadcast service. The More Data field in MAC headers of each multicast frame shall be set to indicate the presence of further buffered multicast MSDUs from the multicast address. If the AP is unable to transmit all of the buffered multicast MSDUs before the next TBTT, the AP shall indicate that it will continue to deliver the multicast MSDUs by setting the Buffered Traffic Indication bit in Multicast Service Info field to 1. Buffered Traffic Indication bit shall be set to 1 until all buffered multicast frames have been transmitted.

Receive Operation for Non-AP STAs in Power Save (PS) Mode

If enhanced multicast and broadcast service is used according to some embodiments of the present invention, the non-AP STA shall wake up before the specified multicast and broadcast listening interval. A non-AP STA shall remain awake until the More Data field of the multicast MSDU indicates there are no further buffered multicast MSDUs, or until Multicast Service is not listed in Multicast Service Info field or Buffered Traffic Indication field indicates that there are no further buffered multicast MSDUs.

Due to legacy compatibility reasons, broadcast and multicast traffic may need to be delivered the traditional way as well unless the AP is sure that all the associated STAs can use enhanced broadcast/multicast service. The STAs using enhanced broadcast/multicast service may need to take this into account in order to avoid duplicated frames.

Alternative Implementations

Alternative implementation options are:
The AP may know the multicast service characteristic itself and may setup the listen interval independently without any multicast service setup signalling.
Multicast Service Info could be sent also in separate frame. By this way the overhead in Beacons is reduced. On the other hand this may not be good from the e.g., roaming STAs point of view. Also from the power save point of view it is good that this info appears with known interval so that the STA can optimise it sleeping cycles accordingly.
Instead of using full multicast MAC addresses in the signalling phase, a compressed format can be used.
As described in invention AP may set the complete Multicast Service Info element to all beacons.

Implementation of the Functionality of the Modules

The functionality of the AP 10 and STA 20 described above may be implemented in the corresponding modules 12 and 22 shown in FIGS. 3 and 4. By way of example, and consistent with that described herein, the functionality of the modules 12 and 22 may be implemented using hardware, software, firmware, or a combination thereof, although the scope of the invention is not intended to be limited to any particular embodiment thereof. In a typical software implementation, the module 12 and 22 would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology now known or later developed in the future. Moreover, the scope of the invention is intended to include the modules 12 and 22 being a stand alone modules, as shown, or in the combination with other circuitry for implementing another module.

The other modules 14 and 24 and the functionality thereof are known in the art, do not form part of the underlying invention per se, and are not described in detail herein. For example, the other modules 24 may include other modules that formal part of a typical mobile telephone or terminal, such as a UMTS subscriber identity module (USIM) and mobile equipment (ME) module, which are known in the art and not described herein.

The present invention allows flexible listen (sleeping) intervals for the multicast services, resulting in more optimal power save for the STAs; separates broadcast and multicast services with different listen intervals and different indications for buffered data; and multicast service info broadcast gives information of the ongoing multicast transmissions for the roaming STAs, where this information may speed up the multicast service setup.

Universal Mobile Telecommunications System (UMTS) Packet Network Architecture FIGS. 4a and 4b show diagrams of the Universal Mobile Telecommunications System (UMTS) packet network architecture. In FIG. 4a, the UMTS packet network architecture includes the major architectural elements of user equipment (UE), UMTS Terrestrial Radio Access Network (UTRAN), and core network (CN). The UE is interfaced to the UTRAN over a radio (Uu) interface, while the UTRAN interfaces to the core network (CN) over a (wired) Iu interface. FIG. 4b shows some further details of the architecture, particularly the UTRAN, which includes multiple Radio Network Subsystems (RNSs), each of which contains at least one Radio Network Controller (RNC). In operation, each RNC may be connected to multiple Node Bs which are the UMTS counterparts to GSM base stations. Each Node B may be in radio contact with multiple UEs via the radio interface (Uu) shown in FIG. 4a. A given UE may be in radio contact with multiple Node Bs even if one or more of the Node Bs are connected to different RNCs. For instance, a UE1 in FIG. 4b may be in radio contact with Node B2 of RNS1 and Node B3 of RNS2 where Node B2 and Node B3 are neighboring Node Bs. The RNCs of different RNSs may be connected by an Iur interface which allows mobile UEs to stay in contact with both RNCs while traversing from a cell belonging to a Node B of one RNC to a cell belonging to a Node B of another RNC. The convergence of the IEEE 802.11 WLAN system in FIG. 1a and the (UMTS) packet network architecture in FIGS. 4a and 4b has resulted in STAs taking the form of UEs, such as mobile phones or mobile terminals. The interworking of the WLAN (IEEE 802.11) shown in FIG. 1a with such other technologies (e.g. 3GPP, 3GPP2 or 802.16) such as that shown in FIGS. 2a and 2b is being defined at present in protocol specifications for 3GPP and 3GPP2. The scope of the invention is intended to include implementations of the same in relation to such a UMTS packet network architecture.

Scope of the Invention

Accordingly, the invention comprises the features of construction, combination of elements, and arrangement of parts which will be exemplified in the construction hereinafter set forth.

What we claim is:

1. A method for power saving comprising:
   receiving in an access point in a wireless local area network a signal comprising information about a proposed first multicast listening interval for a first multicast group from a terminal in the wireless local area network;
   determining in the access point a first multicast listening interval for the first multicast group based at least partly on the information contained in the signal; and
   determining in the access point a second multicast listening interval for a second multicast group;
   wherein the first multicast listening interval for the first multicast group is different from the second multicast listening interval for the second multicast group;
   and wherein the access point can either accept the proposed first multicast listen interval or define a new multicast listen interval.

2. A method according to claim 1, wherein the access point and the terminal indicate their capability to support a multicast listening interval by using new fields in Beacon and Probe Response frames and in (Re)Association Request Frames.

3. A method according to claim 1, wherein the method further comprises setting up multicast service by using Multicast Service Setup signalling.

4. A method according to claim 1, wherein during this signalling phase, the multicast listening interval is agreed between the access point and the terminal.

5. A method according to claim 1, wherein the signal from the terminal contains information about a proposed multicast listen interval based on a multicast service characteristic.

6. A method according to claim 5, wherein the access point also advertises active multicast listening intervals by sending a Multicast Service Info information element in each Beacon and Probe Response frame.

7. A method according to claim 6, wherein the access point also indicates whether there are buffered broadcast data and/or buffered multicast traffic belonging to a certain multicast group.

8. A method according to claim 1, wherein the method further comprises implementing the method via a computer program running in a processor, controller or other suitable module in the access point.

9. A method according to claim 1, wherein the method comprises transmitting multicast traffic using a 'More Data' bit to indicate the access point has buffered data from the same multicast address.

10. A method according to claim 1, wherein the method further comprises providing a communication signal to the terminal based at least partly on a variable multicast listening interval.

11. A method for power saving comprising:
    sending from a terminal in a wireless local area network a signal comprising information about a proposed first multicast listening interval for a first multicast group to an access point in the wireless local area network; and
    receiving in the terminal a first multicast listening interval for the first multicast group;
    wherein the first multicast listening interval for the first multicast group is different from a second multicast listening interval for a second multicast group related to the access point such that the access point can either accept the proposed first multicast listen interval or define a new multicast listen interval.

12. A method according to claim 11, wherein the access point and the terminal indicate their capability to support a multicast listening interval by using new fields in Beacon and Probe Response frames and in (Re)Association Request Frames.

13. A method according to claim 11, wherein the method further comprises setting up multicast service by using Multicast Service Setup signalling.

14. A method according to claim 11, wherein during this signalling phase, the multicast listen interval is agreed between the first and second nodes, points or terminals in the wireless local area network.

15. A method according to claim 11, wherein the signal from the terminal contains information about a proposed multicast listening interval based on a multicast service characteristic.

16. A method according to claim 15, wherein the access point also advertises active listen intervals by sending a Multicast Service Info information element is each Beacon and Probe Response frame.

17. A method according to claim 16, wherein the access point also indicates whether there are buffered broadcast data and/or buffered multicast traffic belonging to a certain multicast group.

18. An apparatus comprising:
    at least one processor; and
    at least one memory including a computer program code, wherein the at least one memory and the computer program code are configured to cause the apparatus to receive a signal comprising information about a proposed first multicast listening interval for a first multicast group from a second apparatus in the wireless local area network, to determine a multicast listening interval for the first multicast group based at least partly on the information contained in the signal; and to determine a second multicast listening interval for a second multicast group;
    wherein the first multicast listening interval for the first multicast group is different from the second multicast listening interval for the second multicast group;
    and wherein the apparatus can either accept the proposed first multicast listen interval or define a new multicast listen interval.

19. The apparatus according to claim 18, wherein the apparatus and second apparatus include an access point or other suitable network node or terminal and a station or other suitable network node or terminal in the wireless local area network.

20. The apparatus according to claim 19, wherein the access point and the station indicate their capability to support multicast listening interval by using new fields in Beacon and Probe Response frames and in (Re)Association Request Frames.

21. The apparatus according to claim 19, wherein the signal from the station contains information about a proposed multicast listening interval based on the multicast service characteristic.

22. The apparatus according to claim 21, wherein the access point also advertises active multicast listening intervals by sending a Multicast Service Info information element in each Beacon and Probe Response frame.

23. The apparatus according to claim 22, wherein the access point also indicates whether there are buffered broadcast data and/or buffered multicast traffic belonging to a certain multicast group.

24. The apparatus according to claim 18, wherein the at least one memory and the computer program code are configured to set up a multicast service by using Multicast Service Setup signalling.

25. The apparatus according to claim 18, wherein during this signalling phase the multicast listening interval for the multicast service is agreed between the first apparatus and the second apparatus in the wireless local area network.

26. The apparatus according to claim 18, wherein multicast traffic is transmitted using a 'More Data' bit to indicate the first apparatus has buffered data from the same multicast or broadcast address.

27. The apparatus according to claim 18, wherein the at least one memory and the computer program code are configured to provide a communication signal to the second apparatus based at least partly on the variable multicast listening interval.

28. A non-transitory computer readable medium stored with code, which when executed by a processor in a first apparatus, causes the first apparatus to perform a method comprising
- receiving in a first apparatus in a wireless local area network a signal comprising information about a proposed first multicast interval for a first multicast group from a second apparatus in the wireless local area network;
- determining in the first apparatus a first multicast listening interval for the first multicast group based at least partly on the information contained in the signal,
- determining in the first apparatus a second multicast listening interval for a second multicast group;
- wherein the first multicast listening interval for the first multicast group is different from the second multicast listening interval for the second multicast group;
- and wherein the first apparatus can either accept the proposed first multicast listen interval or define a new multicast listen interval.

29. An apparatus comprising:
- at least one processor; and
- at least one memory including a computer program code, wherein the at least one memory and the computer program code are configured to cause the apparatus to send in a wireless local area network a signal comprising information about a proposed first multicast listening interval for a first multicast group to a second apparatus in the wireless local area network, and to receive in the apparatus in the wireless local area network a first multicast listening interval for the first multicast group;
- wherein the first multicast listening interval for the first multicast group is different from a second multicast listening interval for a second multicast group related to the second apparatus such that the second apparatus can either accept the proposed first multicast listen interval or define a new multicast listen interval.

30. The apparatus according to claim 29, wherein the apparatus and second apparatus include an access point or other suitable network node or terminal and a station or other suitable network node or terminal in the wireless local area.

31. An apparatus according to claim 30, wherein the access point and the station indicate their capability to support a flexible multicast listening interval by using new fields in Beacon and Probe Response frames and in (Re)Association Request Frames.

32. The apparatus according to claim 30, wherein the signal from the station contains information about a proposed listen interval based on a multicast service characteristic.

33. An apparatus according to claim 32, wherein the access point also advertises active listening intervals by sending a Multicast Service Info information element is each Beacon and Probe Response frame.

34. The apparatus according to claim 29, wherein during this signalling phase, the listening interval for the multicast service is agreed between the apparatus and second apparatus in the wireless local area network.

35. An apparatus according to claim 29, wherein the at least one memory and the computer program code are further configured to set up multicast service by using Multicast Service Setup signalling.

* * * * *